US012708956B2

(12) United States Patent
Birkicht et al.

(10) Patent No.: US 12,708,956 B2
(45) Date of Patent: Aug. 18, 2026

(54) METHOD AND DEVICE FOR PRESSURE SINTERING CONNECTION

(71) Applicant: SEMIKRON ELEKTRONIK GMBH & CO. KG, Nuremberg (DE)

(72) Inventors: Dominic Birkicht, Emskirchen (DE); Matthias Dörrich, Neustadt an der Aisch (DE); Silke Kraft, Nuremberg (DE); Erik Michaelsen, Lauf (DE)

(73) Assignee: SEMIKRON ELEKTRONIK GMBH & CO. KG, Nuremberg (DE)

( * ) Notice: Subject to any disclaimer, the term of this patent is extended or adjusted under 35 U.S.C. 154(b) by 535 days.

(21) Appl. No.: 18/201,726

(22) Filed: May 24, 2023

(65) Prior Publication Data

US 2023/0390858 A1 Dec. 7, 2023

(30) Foreign Application Priority Data

Jun. 3, 2022 (DE) ..................... 10 2022 114 121.7

(51) Int. Cl.
*B23K 20/02* (2006.01)
*B22F 7/06* (2006.01)

(52) U.S. Cl.
CPC ............ *B23K 20/023* (2013.01); *B22F 7/062* (2013.01)

(58) Field of Classification Search
CPC .............................. B23K 20/023; B22F 7/062
See application file for complete search history.

(56) References Cited

U.S. PATENT DOCUMENTS

2017/0103903 A1* 4/2017 Matsubayashi ..... H10W 72/071

FOREIGN PATENT DOCUMENTS

| | | | |
|---|---|---|---|
| DE | 102011080929 | B4 | 7/2014 |
| DE | 102015120156 | A1 | 5/2017 |
| DE | 102022114121 | B3 | 8/2023 |
| EP | 2 506 295 | A2 | 10/2012 |
| EP | 3 279 928 | A1 | 2/2018 |
| EP | 3 709 342 | A1 | 9/2020 |

OTHER PUBLICATIONS

DE 10 2022 114 121.7, Search Report dated Jan. 13, 2023, 5 pages—German, 5 pages—English.
German Patent and Trademark Office (DPMA), Decision to Grant and Grant in DE 10 2022 114 121.7, dated Jun. 23, 2023, 11 pages German, 11 pages English (Machine Translation).

* cited by examiner

*Primary Examiner* — Ricardo D Morales

(74) *Attorney, Agent, or Firm* — Andrew F. Young, Esq.; Nolte Lackenbach Siegel

(57) ABSTRACT

A method and a device for pressure sintering connection of a joining group composed of a first and a second joining partner by means of a device with a lower tool and an upper tool having the steps: providing the joining group at room temperature as an initial temperature, arranging the joining group between the supporting surface and the pressure surface, wherein the joining group has no direct thermal contact with the supporting surface and no direct thermal contact with the pressure surface, introducing pressure onto the joining group, wherein at the start of the introduction of pressure the starting temperature of the joining group is no more than 100K above an initial temperature; increasing the temperature of the sintering agent by at least 50K above the starting temperature; ending the introduction of pressure.

13 Claims, 2 Drawing Sheets

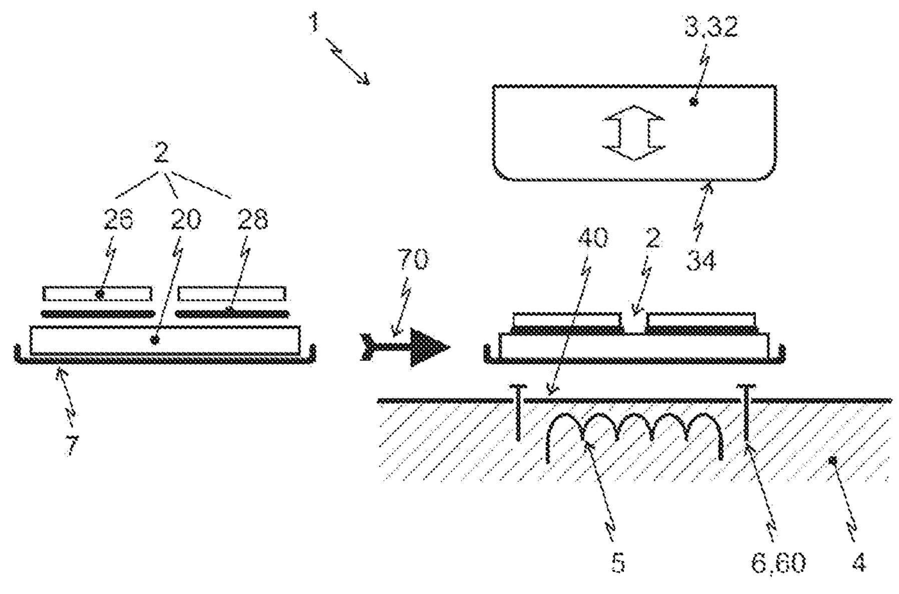
Fig. 1
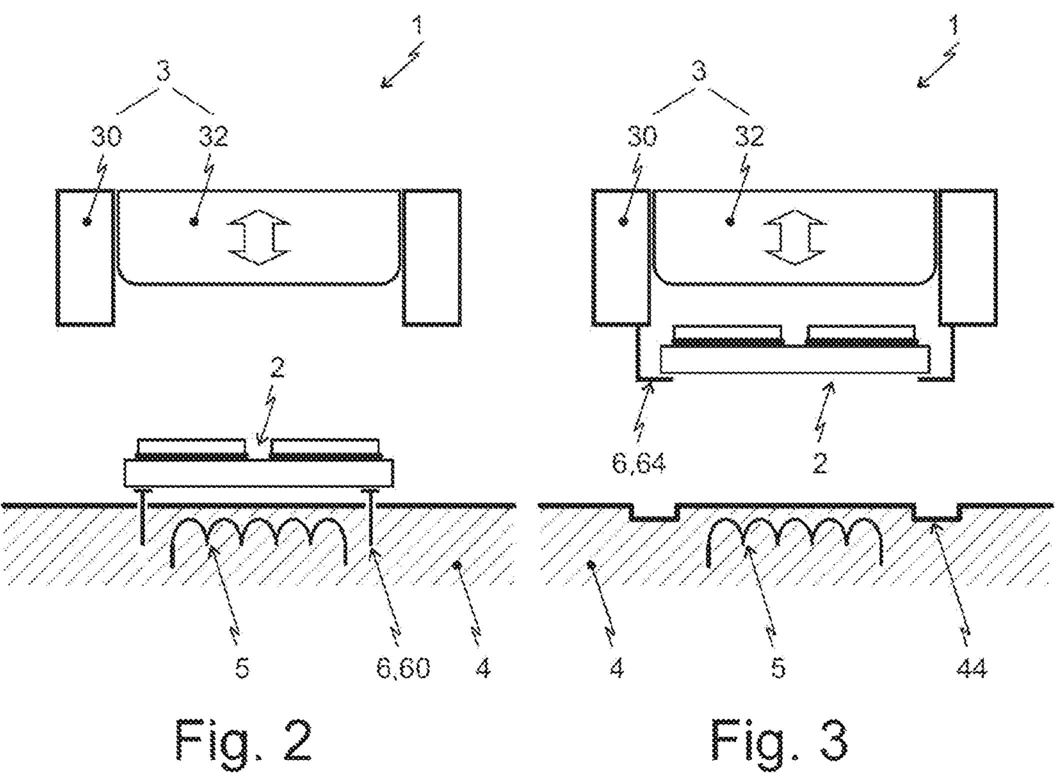
Fig. 2
Fig. 3

METHOD AND DEVICE FOR PRESSURE SINTERING CONNECTION

CROSS REFERENCE TO RELATED APPLICATIONS

This application relates to and claims priority to DE 10 2022 114 121.7 filed Jun. 3, 2022, the entire contents of which are incorporated herein fully by reference.

FIGURE SELECTED FOR PUBLICATION

FIG. 1.

BACKGROUND OF THE INVENTION

Field of the Invention

The invention describes a method and a device for s pressure sintering connection of a first joining group with a first and a second joining partner and a sintering agent arranged therebetween. The sintering agent is heated by means of a heating apparatus, preferably arranged in a lower tool of the device. The sintering agent is converted into a sintering metal by additional pressure and a materially bonded sintering connection is formed between the joining partners. By means of a suitable process control, it is also possible to use sintering agents which not only have metallic components, but may include metal particles composed of precious metal, such as in particular silver.

Description of the Related Art

DE 10 2015 120 156 A1 discloses a generic device with a pressure ram having an elastic pad element for materially bonded pressure sintering connection of a first and a second joining partner of a power electronics component, wherein the elastic pad element of the pressure ram is surrounded by a dimensionally stable frame within which the pad element and a guide part of the pressure ram are guided in a linearly movable manner such that the dimensionally stable frame is lowered to the first joining partner or a workpiece carrier with a first joining partner arranged therein and, after bearing against it, the pressure ram including an elastic pad element is lowered onto the second joining partner and a necessary pressure is exerted onto the elastic pad in order to connect the first joining partner to the second joining partner. It is customary during the sintering process that a covering film is arranged between the pad element, more generally the upper tool, and at least the second joining partner.

DE 10 2011 080 929 B4 discloses a method for producing a compound, in the case of which at least two joining partners are fixedly connected to one another, with the following steps: providing a first joining partner and a second joining partner; providing a connecting means; providing a sealing means; providing a reactor having a pressure chamber; providing a heating element; arranging the first joining partner, the second joining partner and the connecting means in the pressure chamber so that the connecting means is located between the first joining partner and the second joining partner; creating a gas-impervious region in which the connecting means is arranged; creating a gas pressure in the pressure chamber outside the gas-impervious region so that the gas pressure acts on the gas-impervious region and presses the first joining partner, the second joining partner as well as the connecting means located between these against one another with at least 2 MPa; heating the first joining partner, the second joining partner and the connecting means by means of the heating element to a predefined maximum temperature of at least 210° C.; subsequent cooling of the first joining partner, the second joining partner and the connecting means; wherein the volume of the closed pressure chamber is smaller than or equal to 200 ml.

ASPECTS AND OBJECTS OF THE INVENTION

At least one of the objects of the present invention is to provide an improvement over the related art.

Another object and aspect of the present invention is to provide a method and a device for this which makes it possible to use in a simple manner in particular sintering agents which not only have metallic components composed of precious metal.

This object is achieved according to the invention by a method for pressure sintering connection of a joining group composed of a first and a second joining partner by means of a device with a lower tool and an upper tool which are formed to exert a pressure of more than 5 MPa on the joining group which is arranged between a supporting surface of the lower tool and a pressure surface of the upper tool, with the following method steps:

A) providing the joining group at room temperature as an initial temperature;

B) arranging the joining group between the supporting surface and the pressure surface, wherein the joining group has no direct thermal contact with the supporting surface and no direct thermal contact with the pressure surface;

C) introducing pressure onto the joining group by virtue of the fact that the lower tool and the upper tool are moved towards one another, wherein at the start of the introduction of pressure the starting temperature of the joining group and in particular of a sintering agent, which is arranged between the first and the second joining partner of the joining group, is no more than 100K above an initial temperature;

D) increasing the temperature of the sintering agent, in particular by means of a heating apparatus of the lower tool, by at least 50K above the starting temperature;

E) ending the introduction of pressure.

A sintering agent is customarily understood in particular as a paste composed of metal particles which are enclosed/embedded by a liquid. Through the sintering process, i.e., an actuation with pressure, typically in the range between 5 MPa and 40 MPa, and temperature, typically in the range between 100° C. and 300° C., the liquid is driven out of the sintering agent and the metal particles are connected to one another, as a result of which a sintered metal is produced.

Direct thermal contact is understood in particular as bodily contact between two bodies. This explicitly does not include indirect thermal contact which is formed in particular as heat radiation.

It may be advantageous if in method step A) the joining group is arranged on a workpiece carrier surface of a workpiece carrier.

In principle, it may be advantageous if at the start of method step D) at least 10%, preferably already at least 20% and particularly preferably at least 40% of the maximum pressure bear on the joining group.

It is in principle advantageous if between method step D) and E) the sintering agent is transformed entirely or at least partially into a sintered metal and the materially bonded sintering connection is formed or at least initiated between the first and second joining partner.

It is likewise advantageous if in method step C) the increase is no more than in particular no more than 50K.

It is furthermore in principle advantageous if, in the context of this method, a proportion of non-precious metal particles of the total mass of the metal particles of the sintering agent is more than 50%, preferably more than 80% and particularly preferably more than 90%. It is in particular advantageous in this case if the metal of the non-precious metal particles is selected from copper, tin, zinc, aluminum, nickel, titanium, magnesium or chromium in any desired mass ratios or only from the respective metal.

It may be particularly preferred if method steps B) to D), in particular to E) are performed at normal pressure.

It can likewise be particularly advantageous if method steps B) to D), in particular to E) are executed without special process gases, i.e., in air.

It may in principle be advantageous in a method step F) which follows on from the method step E) the joining group is purified in particular with formic acid.

The above-mentioned object is furthermore achieved according to the invention by a device in particular for executing a method with a lower tool with a heating apparatus and with an upper tool, wherein, as a result of the movement of the upper tool towards the lower tool, a pressure of more than 5 MPa can be exerted on a joining group between a supporting surface of the lower tool and a pressure surface of the upper tool, wherein a holding apparatus is formed and provided such that, as long as the supporting surface is adequately spaced apart from the pressure surface, the joining group can be arranged on holding means of this holding device and, in the event of movement of the pressure surface towards the supporting surface, the holding apparatus arranges the joining group on the supporting surface.

It may be particularly advantageous in this case if the holding device has a multiplicity of pins which project out of the lower tool, in particular on its supporting surface, in the direction of the upper tool and are formed to be actively or passively movable in this direction. The head ends of the pins which face the upper tool can advantageously form the holding means in this case. Active movement should be understood here in particular such that an actuator directly assigned to the holding device and in particular acting directly thereon brings about the movement. Passive movement should be understood here in particular such that an apparatus which does not belong to the holding device beings about the movement, by way of example counter to a spring force which acts against it, and in particular acting indirectly.

Alternatively, it may be advantageous if the holding device has a multiplicity of hooks which project out of the upper tool in the direction of the lower tool and are formed to be actively or passively movable in particular perpendicular to this direction. Alternatively, or additionally, the lower tool can have receptacles for respectively assigned hooks.

It may be advantageous if the joining group including a workpiece carrier can be arranged on the holding device.

It may be particularly advantageous if the heating apparatus is formed to increase the temperature of the sintering agent by at least 100K, preferably at least 150K.

Of course, unless this is not explicitly or per se ruled out or is contrary to the concept of the invention, the features named in each case in the singular, in particular the second joining partner, can also be present or arranged multiple times in the method according to the invention or the device according to the invention. Several joining groups can also be processed at the same time.

It will be obvious that the various configurations of the invention, no matter whether they are disclosed in the context of the description of the method or the device, can be realized individually or in any desired combinations in order to achieve improvements. In particular, the features mentioned and explained above and below can not only be used in the indicated combinations, but also in other combinations or on their own without departing from the scope of the present invention.

The above and other aspects, features, objects, and advantages of the present invention will become apparent from the following description read in conjunction with the accompanying drawings for exemplary but nonlimiting embodiments, in which like reference numerals designate the same elements.

BRIEF DESCRIPTION OF THE DRAWINGS

FIG. 1 shows in a schematic lateral sectional view a first device 1 according to the invention during method step B) of the method according to the invention.

FIG. 2 shows in a schematic lateral sectional view a second device 1 according to the invention after method step B) of the method according to the invention.

FIG. 3 shows in a schematic lateral sectional view a third device 1 according to the invention after method step B) of the method according to the invention.

DETAILED DESCRIPTION OF THE PREFERRED EMBODIMENTS

Figure 4:
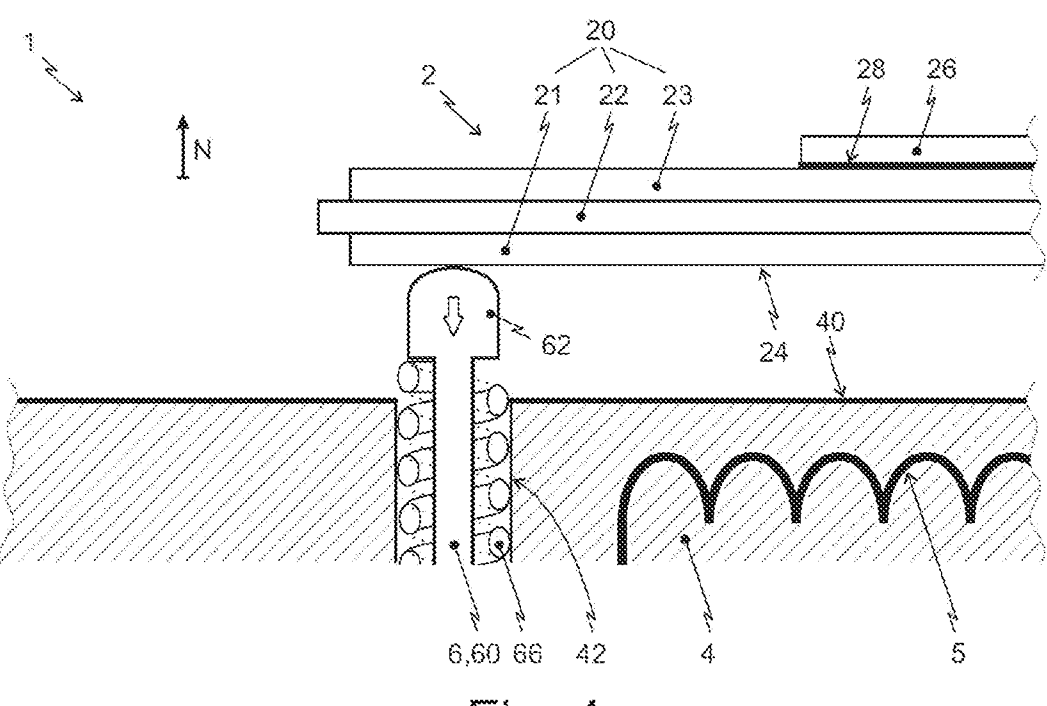
FIG. 4 shows a detailed view of the second device according to the invention prior to method step C).

Reference will now be made in detail to embodiments of the invention. Wherever possible, same or similar reference numerals are used in the drawings and the description to refer to the same or like parts or steps. The drawings are in simplified form and are not to precise scale. The word 'couple' or 'bond' or and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

FIG. 1 shows in a schematic lateral sectional view a first device 1 according to the invention during method step B) of the method according to the invention. Two joining groups 2 are represented, the left one thereof in an exploded representation. Each joining group 2 is composed here, without loss of generality, of a power electronics substrate, as first joining partner 20, with a ceramic isolation body and with copper conducting paths on a surface of this substrate, cf. FIG. 4. Two layers composed of sintering agent 28 are arranged on the conducting paths, on which layers in turn in each case a power semiconductor component, as a second joining partner 26, is arranged. In principle, the first and second joining partners 20,26 can be configured as desired. By way of example, a customary film stack can likewise form a second joining partner as an internal connecting apparatus of a power semiconductor module.

An upper tool 3 of the device 1 according to the invention is furthermore represented, here without loss of generality formed as a customary elastic sintering pad 32 composed of silicon with a Shore-A hardness of 56, and stabilized by metallic additives in such a manner that it can be used at temperatures of more than 200° C. and a pressure of more than 30 MPa. In this case, a representation of a frame element 30 which surrounds this sintering pad 32 and is likewise customary, cf. FIGS. 2 to 4, was dispensed with. As an alternative to such a configuration, the upper tool 3 can by way of example also be formed from one or a plurality of hard dies. The upper tool 3 has a pressure surface 34 irrespective of its concrete configuration.

The device 1 furthermore has a lower tool 4 which has a heating apparatus which is formed and provided to heat a body, in particular a joining group 2, which lies in direct thermal contact on a supporting surface 40 of the lower tool 4. Here, the heating apparatus 5 is formed to increase the body by at least 100K starting from an initial temperature which in the context of the method according to the invention is room temperature or at least in the order of magnitude therefore between 0° C. and 35° C.

The pressure surface 34 is moved towards the supporting surface 40 by means of the interaction which customarily occurs in that the upper tool 3 and the lower tool 4 are moved towards one another. Up to 35 MPa pressure is thus exerted on a body arranged between the pressure surface 34 and the supporting surface 40, here the joining group 2. The body can be heated in the context of the method to above 300° C. by means of the heating apparatus 5.

Both joining groups 2 are arranged in a workpiece carrier 7 which is formed both to transport the joining group 2 and can also be arranged on the lower tool 4, as a result of which the joining group 2 located therein or thereon is then arranged indirectly on the lower tool 4.

For the arrangement of the joining groups 2, a transport device 70 is furthermore represented schematically, which can be formed as a conveying apparatus, by way of example as a conveyor belt, or which can also be formed as a customary handling robot. This transport device 70 transports here the workpiece carrier 7 including joining group 2 into the device.

After transport, the workpiece carrier 7 including the joining group 2 arranged therein comes to lie on a multiplicity of pins 60. These pins 60 form a holding device 6 through which the workpiece carrier 7 does not come into laminar, direct thermal contact with the lower tool 4, more precisely its supporting surface In other words, the object of the holding device 6 is to hold the workpiece carrier 4 temporarily at a distance from the supporting surface 40 of the lower tool 4.

The pins 60 project here out of the lower tool 4 in the direction of the upper tool 3 in such a manner out of the supporting surface 40 of the lower tool 4 that they support it in the corner regions of the workpiece carrier 7, it therefore lies there and thus does not come into direct, laminar thermal contact with the supporting surface 40 itself.

FIG. 2 shows, in a schematic lateral side view, a second device 1 according to the invention after method step B) of the method according to the invention. The device 1 here corresponds to that which is also represented in FIG. 1. The customary frame element 30 is furthermore represented. This frame element laterally surrounds the sintering pad 32 and is mechanically independent of this or is coupled mechanically as here. In case of a relative movement of the upper tool 3 and of the lower tool 4 towards one another, the sintering pad 32 is restricted in its lateral expansion during the associated introduction of pressure onto the joining group 2, cf. FIG. 5.

The method represented here otherwise differs from that according to FIG. 1 only in that the joining group 2 is not arranged in a workpiece carrier, but rather is arranged directly on the pins 60 of the holding device 6.

FIG. 3 shows, in a schematic lateral sectional view, a third device 1 according to the invention after method step B) of the method according to the invention. In contrast to the configuration according to FIG. 2, the upper tool 3 here has the holding apparatus 6. This can moreover naturally also be formed fully independently and thus not as part of the upper tool 3 or lower tool 4.

The holding apparatus 6 is formed here as a multiplicity of hooks 64, which are formed to be movable here in a spring-loaded manner, i.e., passively, into the upper tool 3, more precisely into the frame element 30. The lower tool 4 furthermore has receiving recesses 44 in which portions of the hooks 64 can be arranged.

FIG. 4 shows a detailed view of the second device 1 according to the invention before method step C). The lower tool 4 with heating apparatus 5 is in turn represented. A pin 60 of the holding apparatus 6 is arranged in this lower tool 4 and protruding through its supporting surface 40. This pin 60, including a spring 66 enclosing it, is arranged in a recess 42 of the lower tool 4. The spring 66 has sufficient dimensions that a portion of the joining group 2 lying on a head end 62 of the pin 60 does not push the pin 60 into the lower tool 4.

The joining group 2 itself is formed in a stack-like manner from a first joining partner 20, here a customary power electronics ceramic substrate, a sintering agent 28 and a second joining partner 26, formed here as a power semiconductor component, by way of example a power transistor. The ceramic substrate has an industrial ceramic 22 as a substrate carrier and metallic, in this case copper layers 21,23 on both main surfaces of the industrial ceramic 22.

The sintering agent 28 has, without further restriction to the above-mentioned metallic components, exclusively copper as metallic components. The copper is in this case surrounded in a customary manner, by way of example, by means of an organic wax. The sintering agent 28 furthermore has a customary liquid component, such as, for example, terpineol.

Figure 5:
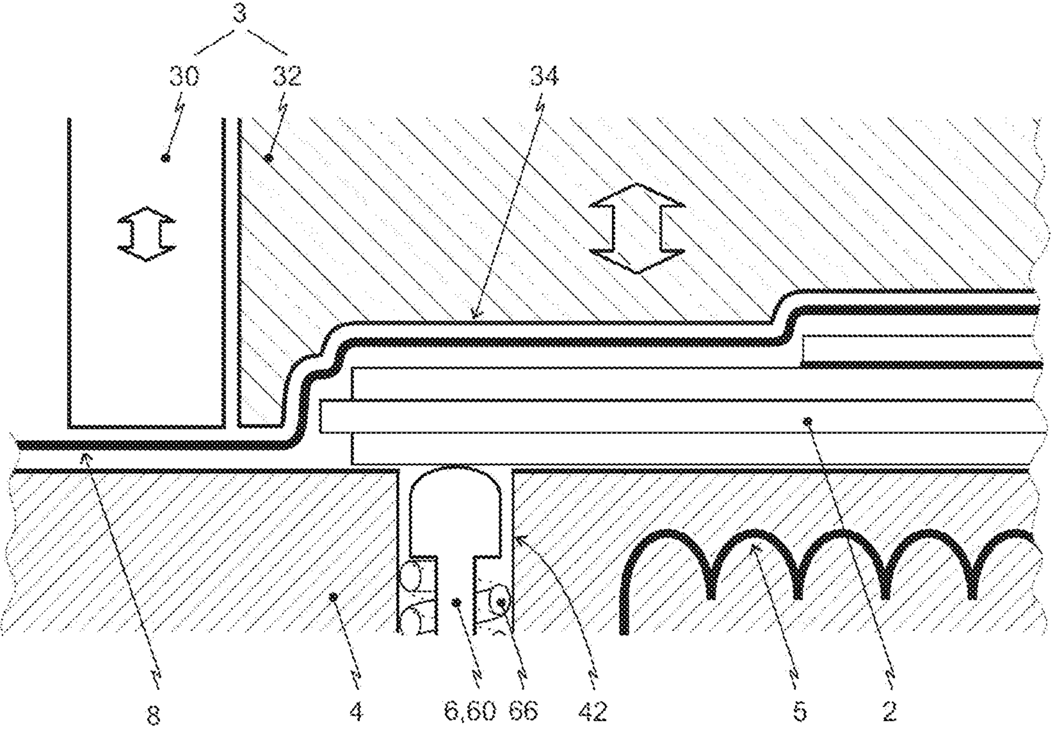
FIG. 5 shows a detailed view of the second device according to the invention prior to method step C).

It is customary to also cover the joining group 2 with a film 8, in particular a PTFE film, cf. FIG. 5, in order to prevent the sintering pad 32 as part of the upper tool 3 sticking to the joining group 2 during pressure actuation.

In the case of the method step represented here, the temperature of the sintering agent 28 as part of the joining group 2 is still around or close to the initial temperature, i.e., around no more than 50° C. Such a slight increase in the temperature of the sintering agent 28 in comparison with the initial temperature of 20° C. can be performed, for example, by heat radiation, and by indirect thermal contact, of the lower tool 4.

After the method step represented here, one thus begins to introduce pressure onto the joining group 2 by virtue of the fact that the lower tool 4 and the upper tool 3 are moved towards one another. In this case, the sintering pad 32 of the upper tool 3 presses on the joining group 2 and this on the die 60, which is as a result pushed into the lower tool 4 counter to the spring force of its spring 66. The introduction of pressure onto the joining group 2 and thus also onto the sintering agent 28 is now furthermore performed.

FIG. 5 shows a detailed view of the second device 1 according to the invention after method step C). The components of FIG. 4, as well as a PTFE film 8 already described and the upper tool 3 with the sintering pad 32 and the frame element 30 are represented here.

At the start of method step D), i.e., the increase in the temperature of the sintering agent 28, by means of heating of the joining group 2 by the heating apparatus 5 of the lower tool 4 to more than 50K in comparison with the starting temperature, already at least 10%, preferably already at least 20% and particularly preferably at least 40% of the maximum pressure act on this joining group 2.

As a result of this action of pressure, the sintering pad 32 has already deformed and bears in a form-fitting manner against the joining group 2 and is restricted in its lateral extent by the frame element 30.

In the further course of the method, i.e., between method step D) and E), the sintering agent 28 is transformed fully or at least partially into a sintered metal 28. In the case of a partial transformation, a so-called presintering is performed in the case of which the sintering connection between the two joining partners 20, 26 does not yet reach its full load-bearing capacity.

It is significant that the method is operated without explicit process gas, such as nitrogen, for the entire method process described in the context of FIGS. 4 and 5. These method steps are furthermore executed under normal pressure, i.e., in the case of the prevailing atmospheric pressure, typically around 1013 hPa. These process conditions can only be used in the case of the aim of achieving outstanding quality of the sintering connection as a result of the performance of the method by means of the described process control, i.e., through the interaction of temperature and pressure profile. Moreover, the method according to the invention is also outstandingly suitable for sintering agents with precious metals, in particular silver, as metallic components.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A method for pressure sintering connection of a joining group composed of a first and a second joining partner by means of a pressure sintering device with a lower tool and an upper tool which are formed to exert a pressure of more than 5 MPa on the joining group which is arranged between a supporting surface of the lower tool and a pressure surface of the upper tool;

the lower tool with a heating apparatus and the upper tool, wherein, as a result of a movement of the upper tool towards the lower tool, the pressure of more than 5 MPa can be operably exerted on the joining group between the supporting surface of the lower tool and the pressure surface of the upper tool;

wherein a holding apparatus is formed such that, as long as the supporting surface is adequately spaced apart from the pressure surface, the joining group can be arranged on the holding means of the holding device and in movement of the pressure surface towards the supporting surface, the holding apparatus arranges the joining group on the supporting surface; and wherein the holding device has a plurality of the pins which project out of the lower tool on the supporting surface, in the direction of the upper tool; and the plurality of pins are formed to be actively or passively movable relative to the upper tool; and wherein respective head ends of the pins that face the upper tool form the holding means;

comprising the following method steps:

A) providing the joining group at room temperature as an initial temperature;

B) arranging the joining group between the supporting surface and the pressure surface, wherein the joining group has no direct thermal contact with the supporting surface and no direct thermal contact with the pressure surface;

C) introducing a pressure onto the joining group by moving the lower tool and the upper tool towards one another, wherein at the start of the introduction of the pressure the starting temperature of the joining group and a sintering agent, which is arranged between the first and the second joining partner of the joining group, is no more than 100K above the initial temperature;

D) increasing the temperature of the sintering agent, with a heating apparatus of the lower tool, by at least 50K above the starting temperature; and E) ending the introduction of pressure.

2. The method, according to claim 1, wherein:

in method step A) the joining group is arranged on a workpiece carrier surface of a workpiece carrier.

3. The method, according to claim 2, wherein:

at a start of method step D) at least 10% of a maximum pressure bears on the joining group.

4. The method, according to claim 3, wherein:

between the method steps D) and E) the sintering agent is transformed at least partially into a sintered metal and the materially bonded sintering connection is formed between the first and second joining partner.

5. The method, according to claim 1, wherein:

in the method step C) at the start of the introduction of pressure the starting temperature is no more than 50K above the initial temperature.

6. The method, according to claim 4, wherein:

the sintering agent has metal particles including non-precious metal particles; and a proportion of the non-precious metal particles of a total mass of the metal particles of the sintering agent is more than 50%.

7. The method, according to claim 6, wherein:

the metal of the non-precious metal particles is selected from the group consisting of copper, tin, zinc, aluminum, nickel, titanium, magnesium, and chromium.

8. The method, according to claim 4, wherein:

method steps B) to E) are performed at normal pressure.

9. The method, according to claim 8, wherein:

method steps B) to E) are executed in a normal atmospheric air.

10. The method, according to claim 4, wherein:

in a method step F) which follows on from method step E) the joining group is purified with formic acid.

11. A pressure sintering connection device, provided according to claim 1, wherein:

the holding device further comprises:

a plurality of hooks that project out of the upper tool in the direction of the lower tool; and the plurality of hooks are formed to be actively or passively movable in perpendicular to the direction of the lower tool.

12. The device, according to claim 11, wherein:

the joining group further comprises the workpiece carrier arranged on the holding device.

13. The device, according to claim 12, wherein:

the heating apparatus is formed to increase the temperature of the sintering agent by at least 150K.

* * * * *